United States Patent
Petillon

(10) Patent No.: US 7,346,437 B2
(45) Date of Patent: Mar. 18, 2008

(54) SECURE INTERACTIVE 3D NAVIGATION METHOD AND DEVICE

(75) Inventor: Jean-Paul Petillon, Miramas (FR)

(73) Assignee: Eurocopter, Marignane (FR)

( * ) Notice: Subject to any disclaimer, the term of this patent is extended or adjusted under 35 U.S.C. 154(b) by 196 days.

(21) Appl. No.: 10/553,965

(22) PCT Filed: Apr. 16, 2004

(86) PCT No.: PCT/FR2004/000940

§ 371 (c)(1),
(2), (4) Date: Oct. 19, 2005

(87) PCT Pub. No.: WO2004/095394

PCT Pub. Date: Nov. 4, 2004

(65) Prior Publication Data

US 2006/0235581 A1    Oct. 19, 2006

(30) Foreign Application Priority Data

Apr. 16, 2003    (FR) .................................. 03 04753

(51) Int. Cl.
*G01C 23/00*    (2006.01)

(52) U.S. Cl. ................... 701/3; 701/9; 701/10; 701/13; 701/206; 701/200; 701/211; 244/75.1

(58) Field of Classification Search ................... 701/3, 701/4, 5, 8, 9, 10–16, 200, 206, 211; 244/75.1, 244/115
See application file for complete search history.

(56) References Cited

U.S. PATENT DOCUMENTS

| | | |
|---|---|---|
| 4,839,658 A | 6/1989 | Kathol et al. |
| 5,381,338 A | 1/1995 | Wysocki et al. |
| 5,555,175 A | 9/1996 | D orso |
| 6,114,990 A | 9/2000 | Bergljung et al. |
| 6,421,603 B1 | 7/2002 | Hartmann et al. |
| 6,424,889 B1 | 7/2002 | Bonhoure et al. |
| 6,721,714 B1 * | 4/2004 | Baiada et al. .................. 705/7 |

* cited by examiner

*Primary Examiner*—Gertrude A. Jeanglaude
(74) *Attorney, Agent, or Firm*—Young & Thompson

(57) ABSTRACT

A safe interactive navigation apparatus and method allows the crew of an aircraft to prepare and follow a safe flight plan without relying on instrument flying infrastructure. An aircraft navigation assistance method calculates a continuous, three-dimensional projected path on board the aircraft as a function of data related to the route and characteristics of the aircraft.

22 Claims, 4 Drawing Sheets

Fig.4
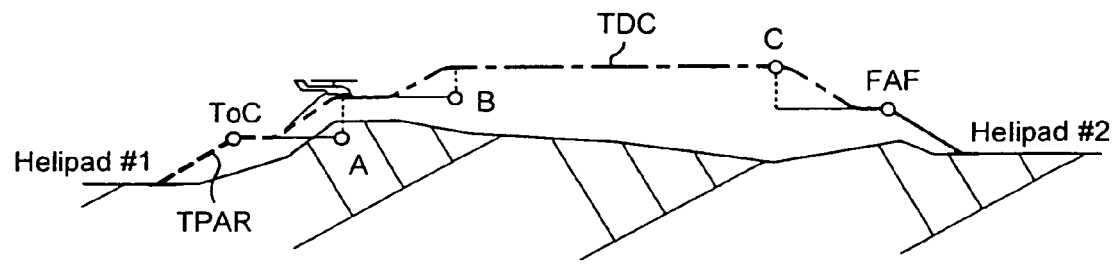
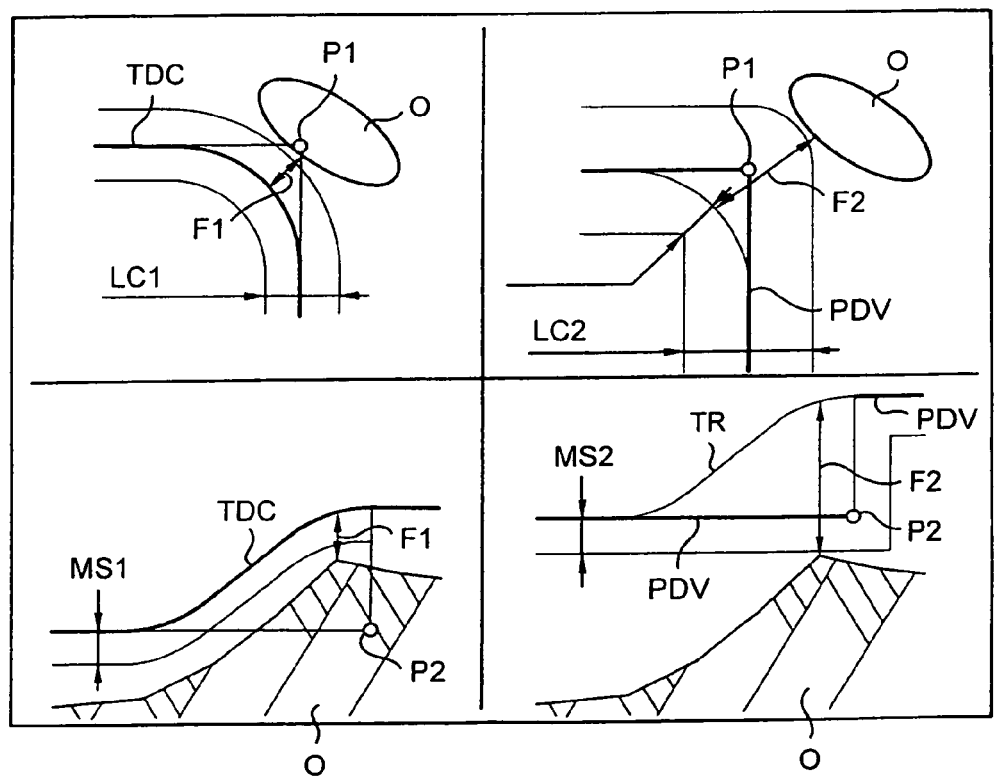
Fig.5

SECURE INTERACTIVE 3D NAVIGATION METHOD AND DEVICE

FIELD OF THE INVENTION

The present invention relates to a safe interactive navigation method and apparatus enabling the crew of an aircraft to prepare and follow a safe flight plan without relying on instrument flying infrastructure.

The invention relates to the field of flight management systems (FMS) for aircraft, and more particularly to flight management systems for helicopters.

BACKGROUND OF THE INVENTION

The FMS concept usually covers the functions of positioning, preparing flight plans, and guidance.

Positioning serves continuously to determine where the aircraft is in three-dimensional space (latitude, longitude, and altitude). Implementing this function makes use of a set of sensors continuously delivering a state vector of the aircraft, including sensors for ground speed, rate of turn, trim and heading, and air speed.

In a conventional FMS, a flight plan is essentially a succession of rectilinear segments that are horizontal, i.e. without any vertical dimension.

The preparation of flight plans (PDVs) and their storage generally covers: i) databases containing PDVs and the points constituting the PDVs; ii) optionally, means for loading and transferring said databases to or from preparation means on the ground (removable storage modules); iii) means for editing said databases (a man-machine interface based on a control and display unit (CDU), for example); and iv) means for selecting one PDV—from amongst all those in the database—for input to the guidance function. This PDV is referred to as the "destination flight plan". This PDV is also usually displayed on a chart background.

Guidance consists in evaluating the differences between the aircraft state vector and the PDV that has been selected as the destination PDV. This function generates instructions for the automatic flight control system (AFCS) or autopilot (AP) and for the human pilot, enabling the aircraft to be kept on the flight plan.

The navigation systems that are presently in operation can be classified in two categories: visual flight rules (VFR) and civil instrument flight rules (civil IFR).

VFR navigation systems can define flight plans in two dimensions (2D) only. The flight plan is constituted by an ordered list of geographical points defined solely by their latitudes and longitudes (no altitude information). To construct a flight plan, the pilot can select points in the database, or can create these points if so desired.

In VFR systems, the guidance function serves to ensure that the horizontal trace of the aircraft trajectory is as close as possible to rectilinear segments interconnecting successive points in pairs. There is no management of altitude by the navigation system. It is the pilot who selects and maintains flying altitude (making use, where appropriate, of the "acquire and hold altitude" mode of the AP). The altitude selected for the flight can be anticipated by visually examining a digital chart (including terrain height information) if there is one on board the aircraft, or else a paper chart. Ultimately, maintaining separation from the terrain and obstacles is a task that is achieved visually by the pilot.

Civil IFR navigation systems enable flight plans to be managed in three dimensions (3D). Under such circumstances, the construction of a flight plan is founded on a database of "branches", i.e. horizontal rectilinear segments and distance measurement equipment arcs (DME arcs) which are used only rarely, and solely in the terminal stage prior to the final approach. Each segment is associated with a minimum flying altitude and the necessary data concerning lateral and vertical localization and guidance.

The database is closed and certified. The term "closed" means that the pilot cannot change its content. The term "certified" means that the database DB has been constructed by the appropriate aviation authority which guarantees adequate separation between the branches and the terrain and obstacles. Furthermore, all necessary precautions are taken to guarantee the integrity of its content on board the aircraft.

Constructing an IFR flight plan consists in selecting an itinerary from a network of "air routes".

Such an IFR navigation system satisfies the needs of commercial transport planes, but it impedes performing certain missions that aircraft are required to perform, in particular those of civilian helicopters which present special characteristics.

The transit stage of a helicopter mission is usually performed at lower altitudes than those used by commercial transport planes, in order to avoid interfering with them. Flying at low altitude also presents numerous other advantages: shorter mission times; fuel savings; better comfort for passengers and crew since helicopter cabins are not pressurized. This point is particularly crucial when transporting certain injured persons who cannot tolerate any variation in pressure.

Helicopters usually take off and land away from airport structures. Mention can be made, for example, of emergency medical service (EMS) missions where the landing point might be the roof of a hospital or a completely unprepared area such as a football pitch or a field situated near an accident.

Most helicopter missions are emergency missions (this applies particularly to EMS missions), which puts severe constraints on the opportunities for meticulous preparation being performed on the ground.

Even when the emergency is not as great as that for an EMS mission, helicopter missions are often varied and specific, unlike the regular routes followed by commercial air transport; therefore, as a general rule, flight plans cannot be reused several times over, which means that a ground team dedicated to preparing missions is unlikely to be economically viable.

Because of these specific features, most helicopter missions can be undertaken only under conditions of good visibility, known as visual meteorological conditions (VMC). It is estimated that close to 40% of civilian helicopter missions are prevented because of poor weather conditions.

The invention seeks to provide a helicopter with "stand-alone" capacity for IFR flight, i.e. not relying on air route networks dedicated to commercial airliners and away from airport infrastructures. Another object is to increase the reactivity that is frequently required of a helicopter crew.

U.S. Pat. No. 6,421,603 (Pratt et al.) describes a method of evaluating the risks of interference between an intended flight plan and obstacles, in which the flight plan is defined in the form of a coarse trajectory made up of a sequence of segments having parameters defining their extent in three dimensions (horizontally and vertically); a route generator converts those segments and parameters into parallelepipeds or polygons in order to constitute a route model; stationary obstacles are represented in the form of terrain rectangles having altitudes, and in the form of terrain rectangles subdivisions, while moving obstacles are modeled by means of segments, in a manner similar to the flight plan. Interference is detected by comparing the respective models for the itinerary and the obstacles; an alarm is triggered when interference is detected.

That system does not enable the pilot to be shown the portion of the trajectory that corresponds to the detected interference; nor does it make it possible to manage in real time a precise predicted trajectory that is likely to be followed very closely by a rotary wing aircraft operating at low altitude.

U.S. Pat. No. 6,424,889 (Bonhoure et al.) describes a method of generating a horizontal trajectory for avoiding zones that are dangerous for an aircraft; the method comprises determining circles that are tangential to the trajectory at an initial point and at a final point; determining tangents to the circles and to models of the dangerous zones; selecting pairs of tangents that define a skeleton trajectory, and determining a 2D trajectory comprising circles interconnecting the tangents; that method does not enable on-board personnel to intervene in planning the itinerary.

OBJECTS OF THE INVENTION

An object of the invention is to propose a system for providing assistance in navigating, guiding, and piloting an aircraft on instruments beyond the range of IFR infrastructures.

An object of the invention is to propose a system for providing assistance in navigating, guiding, and piloting a rotary wing aircraft at low altitude.

An object of the invention is to propose an interactive and stand-alone method of planning and following a safe flight for use by personnel on board an aircraft, and apparatus for implementing the method.

An object of the invention is to propose a system for providing assistance in navigating, guiding, and piloting an aircraft that is improved and/or that remedies at least in part the drawbacks of prior art FMS methods and apparatuses.

SUMMARY OF THE INVENTION

In a first aspect, the invention provides a method of providing assistance in navigating an aircraft along an itinerary in which a predicted trajectory (for the aircraft) is calculated continuously and in three dimensions close to the itinerary, as a function in particular of the characteristics of the aircraft, so as to obtain a trajectory that can be used both as a basis for instructions to a pilot or to an autopilot, and that can also be used directly for calculating (or detecting) interference with terrain and/or obstacles.

Preferably, for most of the points of the predicted trajectory, and generally for every point of said trajectory, a predicted time/date and/or speed is calculated as a function in particular of the characteristics of the aircraft, thus making it possible in particular to provide the pilot at all times with speed instructions adapted to the trajectory to be followed.

All or part of the predicted trajectory can be calculated discretely, point by point: starting from an initial state vector of the aircraft, simulation is used to calculate a later state vector of the aircraft, i.e. a vector corresponding to a time increment; this is preferably performed by a module for simulating an AP or an automatic flight control system (AFCS), by a module for simulating the aircraft, and by a module for simulating guidance.

The predicted trajectory may also be calculated analytically, by solving a system of equations.

In a preferred implementation, the method comprises the following steps:

i) recording, in at least one on-board memory, predicted capabilities or characteristics of the aircraft, together with a model of the terrain overflown by the itinerary; and then, generally during the flight and using an on-board computer;

ii) calculating a predicted trajectory in three dimensions that has no angle points, that is close to said itinerary, and that corresponds to said predicted capabilities or characteristics of the aircraft;

iii) determining any interference between a safety volume extending along said predicted trajectory and the terrain overflown by the aircraft; for this purpose, and preferably, determining a tube or tunnel that extends along the trajectory and presents a section that corresponds to safety margins;

iv) looking to see whether a point of the terrain model is included inside the tube or tunnel and if so, specifying at least one portion of the trajectory that interferes with the terrain model;

v) presenting said trajectory and/or said interfering trajectory portion to an on-board operator in a manner that is repeated over time at a presentation frequency that is sufficiently high to allow the on-board operator to modify said trajectory so as to cause said interference to disappear; and vi) watching for the input of any data modifying the itinerary and/or the trajectory, and once data modifying the itinerary and/or the trajectory has been input by an operator, modifying where appropriate the itinerary as a function of said data and reiterating operations ii) to vi).

Preferably, and in addition, a state vector of the aircraft (3D position, 3D speed, aircraft weight, state of each engine) is monitored and/or measured, and in the event of any substantial change in a parameter of the state vector being detected, operations ii) to vi) are reiterated.

Preferably, and in addition, an aircraft environment vector (2D wind speed, air density, air temperature) is monitored and/or measured, and when any substantial variation in a parameter of the environment vector is detected, operations ii) to vi) are reiterated.

These operations are performed by means on board the aircraft, generally repeatedly all along the flight, and at regular time intervals, e.g. at said presentation frequency.

Because the predicted trajectory is corrected at regular time intervals at an updating frequency as a function of current parameters relating to the aircraft, the current flight point of the aircraft, and the current parameters relating to the outside environment, an updated setpoint trajectory is obtained for the pilot and/or the autopilot of the aircraft.

According to an essential characteristic of the invention, the calculated predicted trajectory has three dimensions in space, and each point of said trajectory also has a predicted time/date stamp as a function of a calculated predicted speed at each point on the predicted trajectory as a function of the performance of the aircraft, its operating characteristics, and characteristics of the environment.

Each point of the predicted trajectory is defined by three position values (latitude, longitude, and altitude), and by a time value obtained from the predicted speed; each state vector of the aircraft further includes the three predicted speed components calculated for that point.

Because the predicted speed of the aircraft is calculated for each point on the trajectory, the shapes of turns, which have radii that depend on speed, are calculated for each turn as a function of the values taken by speed along said trajectory portion; this serves to obtain a predicted trajectory that is much closer to (future) reality.

Managing speed all along the trajectory also makes it possible to manage appropriately slopes relative to the ground while changing altitude. Usually, a pilot adopts a predefined vertical velocity that is compatible with passenger comfort (to avoid the undesirable physiological effects of pressure changes that are too fast when the vertical velocity is too great). The slope relative to the ground thus depends on the horizontal speed of the aircraft and to a lesser extent on wind.

In a preferred implementation of the invention, prior to calculating the predicted trajectory, there are determined firstly, for the "current" point, which is the starting point of the trajectory to be calculated, a "ground" speed in modulus and direction, on the basis of a measured "air" speed; and secondly, for each of the segments of the itinerary, a "ground" speed in modulus and direction on the basis of a setpoint air speed as planned by the pilot for the segment in consideration.

The predicted trajectory is then calculated in a reference frame associated with the ground, which makes it possible in particular to detect interference with the terrain; for guidance purposes in particular, the speed at the current point on the predicted trajectory—also referred to as the "setpoint speed"—and as calculated relative to the ground, is converted into a setpoint speed relative to the air by using an estimated wind speed.

The invention thus relies on generating, substantially in real time, a precise predicted trajectory that is continuously updated to match the actual parameters and conditions of the flight being undertaken by the aircraft; the invention is also based on generating a safety volume in the form of a tube or tunnel of small (and varying) section extending along said curvilinear trajectory; this setpoint trajectory and this volume are calculated as a function of itinerary data as input and/or modified by the pilot or the operator using an on-board tool for graphically constructing an itinerary, said data being recorded in a memory associated with a navigation computer of the aircraft.

Preferably, in order to present any such potential interference to the pilot or the operator, a chart of the terrain to be overflown is displayed on a screen together with a horizontal projection (i.e. a projection in a horizontal plane) of the itinerary and a horizontal projection of the predicted trajectory—also referred to as the "planned" trajectory—, and a first distinctive sign is given to the or those portions of the horizontal projection of the predicted trajectory for which interference has been detected.

The horizontal projection of the (theoretical) predicted trajectory is generally constituted by loxodromic arcs (great circles on the terrestrial globe) that are tangential to arcs of small circles that correspond to turns; these small circles are replaced by cycloid arcs when wind is taken into consideration while calculating the predicted trajectory.

Preferably, and in addition, said screen displays a vertical section along the predicted trajectory, said section showing: i) an icon representing the aircraft; ii) the profile of the overflown terrain; iii) the predicted trajectory; and iv) the projection of the itinerary; and a second distinctive sign is given to the or those portions of the vertical projection of the predicted trajectory for which interference has been detected; also preferably, the second distinctive sign is identical or similar to the first distinctive sign.

The vertical section view of the predicted trajectory is generally constituted by rectilinear segments that are horizontal (levels) or inclined (climbing or sinking at a constant rate of climb) together with parabolic arcs of horizontal axis (climbing or sinking at constant acceleration), of vertical axis (vertical acceleration at constant horizontal speed); or of inclined axis (vertical and horizontal accelerations that are constant and non-zero).

The first and second distinctive signs generally comprise a visual sign such as a color contrasting with the color of the portions of the (horizontal and/or vertical) projection of the predicted trajectory for which no interference has been detected.

Said presentation frequency and/or said updating frequency is/are preferably not less than 1 hertz (Hz) and lie more preferably in the range 1 Hz to 100 Hz, and in particular in the range 5 Hz to 100 Hz, and specifically close to 10 Hz to 50 Hz.

The method of the invention acts in real time to provide the pilot or operator on board the aircraft with piloting assistance that is of improved accuracy, in particular because it makes it possible to use smaller safety margins.

Specifically because the predicted trajectory is determined while taking account of the detected real wind, it is possible to improve significantly the accuracy of the prediction and to take smaller horizontal and vertical safety margins into account while detecting possible interference between the trajectory and the terrain.

Furthermore, and more advantageously, in order to verify the safety of the predicted or "setpoint" trajectory for the aircraft, it is verified that the difference between said trajectory and the current position of the aircraft remains below a predetermined value, and otherwise an alarm is triggered and/or a warning sign is displayed; where appropriate, a re-joining trajectory is calculated (in 3D) to bring the current position of the aircraft back to the setpoint trajectory.

In another aspect, the invention proposes apparatus on board, or suitable for mounting on board, an aircraft to facilitate navigating, guiding, and piloting the aircraft, the apparatus comprising a system programmed to calculate a predicted aircraft trajectory continuously in three dimensions that is close to an itinerary and as a function of characteristics of the aircraft.

The apparatus preferably includes a tool for inputting itinerary data, a module for monitoring the input of data via said tool, and for causing trajectory calculation to be reiterated whenever itinerary data is modified, and also a display member for displaying the calculated trajectory.

In a preferred embodiment, the apparatus comprises:
  means for acquiring parameters relating to the aircraft and to the outside environment, including means for determining accurately the position of the aircraft in three dimensions;
  a memory for storing the itinerary;
  a memory containing a model of the terrain to be overflown;
  a screen for displaying a chart to an operator on board the aircraft, together with the necessary interface;
  an interactive tool for graphically constructing the itinerary;
  trajectory calculation means for calculating a planned trajectory that is essentially curvilinear in three dimensions, that is close to the itinerary, and that corresponds to the predicted capabilities of the aircraft, preferably at a calculation frequency that is not less than the presentation frequency;
  detector means for detecting possible interference between a safety volume extending along and around said trajectory and the terrain overflown by the aircraft;

visual presentation means for presenting any interference to an on-board operator in a manner that is repeated in time and at a presentation frequency that is high enough to allow the operator to modify said itinerary using the interactive tool so as to cause said interference to disappear; and a guidance calculator having one of its inputs receiving the setpoint trajectory generated by the trajectory calculator and having another input receiving the state vector of the aircraft as measured by the sensors; the outputs from the guidance calculator are connected to the device for displaying data to the pilot and also to the autopilot system.

Other characteristics and advantages of the invention appear in the following detailed description which refers to the accompanying drawings and illustrates preferred implementations of the invention by way of non-limiting example.

Unless stated to the contrary, in the present application: "2D" means "(having) two dimensions"; "3D" means "(having) three dimensions"; "PDV" means "flight plan"; "TDC" means "setpoint trajectory" or "predicted trajectory"; "FAF" means "final approach fix"; "ToC" means "top of climb" (end of takeoff).

BRIEF DESCRIPTION OF THE DRAWINGS

FIGS. 3 and 4 are respectively a horizontal projection view and a vertical section view showing a predicted trajectory in accordance with the invention—represented by bold lines going from a first helipad H1 to a second helipad H2 and passing via five points ToC, A, B, C, FAF—together with a real trajectory—drawn using dashed lines—suitable for being followed by an aircraft flying along an itinerary corresponding to the flight plan of FIGS. 1 to 2.

In FIGS. 1 to 4, an aircraft is represented by a cross in FIGS. 1 and 3 and as a diagrammatic helicopter in FIGS. 2 and 4.

FIG. 5 is a diagram showing how smaller safety margins can be used with the invention: the first row represents a horizontal plan view of an TDC in accordance with the invention (left-hand column) and of a conventional flight plan (right-hand column), together with the widths of the safety corridors respectively associated therewith—drawn in dashed lines; the second row comprises diagrammatic vertical section views of an TDC of the invention (left-hand column) and of a conventional flight plan (right-hand column), together with the altitude safety margins that are respectively associated therewith.

DETAILED DESCRIPTION OF THE INVENTION

In the meaning of the present application, the term "itinerary" designates a succession of waypoints to be overflown, approached, or landed on, and where appropriate a succession of segments or "legs" defined by taking these points in pairs.

Each itinerary portion or segment can be defined by the three coordinates at each of the two ends of the segment; alternatively, an itinerary segment can be defined by the latitude and longitude only of each of its ends, together with the altitude of the segment; in a variant, the altitude can be replaced by a height at which the highest point of the terrain overflown by said segment is itself to be overflown.

For each waypoint of the itinerary, it is also possible to define whether the point is to be overflown or to be approached; it is also possible to specify a safety width and a safety height defining a safety volume for all or part of the itinerary, in particular for the takeoff and landing segments.

An itinerary as defined in this way presents the advantage of being easy to use by people familiar with conventional flight plans and routes; other ways of creating or modifying an itinerary of the invention include, in particular generating 3D splines passing through predefined 3D points (or constraints).

Figure 1:
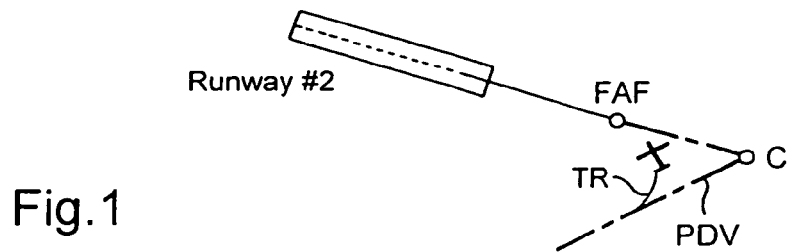
FIGS. 1 and 2 are respectively a horizontal projection view and a vertical section view illustrating the notion of a flight plan in prior art implementations. The flight plan as "seen" by a prior art FMS is made up of bold-line segments ("ToC-A-B-C-FAF"). These diagrams also show—in the form of a dashed line—a real trajectory that can be followed by an aircraft following the flight plan.
Figure 2:
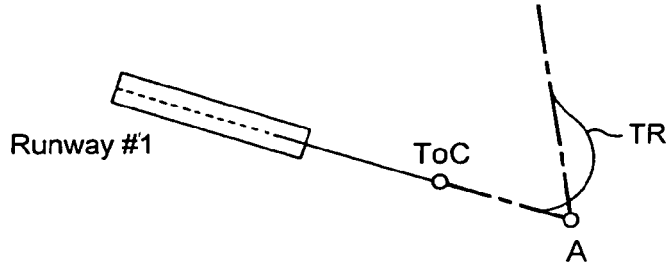

With reference to FIGS. 1 and 2, it can be seen that the real trajectory TR followed by the aircraft necessarily departs significantly from the flight plan TDC that is in the form of a zigzag line in horizontal projection (FIG. 1), with departures occurring in particular during turns, and also when changing altitude in a stepsize succession of levels, which likewise cannot be followed closely by the aircraft. In IFR procedures, such a flight plan is usually made safe by providing large lateral margins in order to be able to contain turns therein, together with excessive vertical margins; stages of climbing "stepwise" are "smoothed" by the invention, as shown in FIG. 4, with the benefit of greater ease in making those stages compatible with the terrain: FIG. 2 shows an altitude of the flight plan in conflict with the terrain at waypoint A, whereas the real and predicted trajectories do not interfere with the terrain (FIGS. 3 and 4).

In an FMS of the invention, the predicted trajectory TDC is a continuous 3D line without any angle points, it is graduated in time, and it is capable of being "flown" by the host aircraft. One way of "constructing" such a trajectory is to rely on a framework of horizontal rectilinear segments similar to a conventional flight plan.

Figure 3:
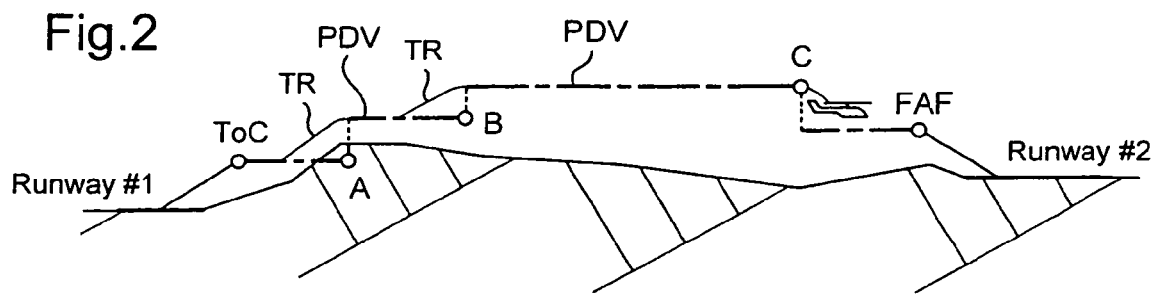

With reference to FIGS. 3 and 4, the predicted trajectory TDC extends a trajectory TPAR forming a part of the trajectory that the aircraft has already flown at the instant under consideration; the part of the trajectory that has already been followed is shaded in FIGS. 3 and 4.

The real trajectory TR (also shown as a fine dashed line) can remain very close to the predicted trajectory TDC as calculated, and also referred to as the "setpoint trajectory".

In accordance with an aspect of the invention, the pilot creates, modifies, moves, or deletes elements—such as the points A, B, C—from the framework of the trajectory in order to modify the trajectory.

The increased accuracy in the definition of the planned trajectory makes it possible in particular to reduce drastically the minimum safety distances that need to be complied with, as illustrated by the diagrams of FIG. 5: the conventional definition (illustrated in the right-hand column) of a flight plan PDV imposes a separation distance at certain locations determined relative to the terrain and represented by arrows F2, which are much greater than the distance F1 (left-hand column) that is strictly required to take account of errors in localization and lack of precision in piloting; as a result the width LC1 of the safety corridor associated with the trajectory TDC is much narrower than the width LC2 of the safety corridor associated with the flight plan PDV; in the invention (left-hand column), a waypoint P1 or P2 on the itinerary can interfere with an obstacle O even though the predicted setpoint trajectory TDC does not interfere therewith; the lateral and vertical safety distances LC1 and MS1 can thus be of the order of a few tens or hundreds of meters only.

In a conventional FMS, horizontal guidance is performed on the basis of the lateral difference between the aircraft and the current rectilinear segment. A turn anticipation mechanism, associated with the limited authority of the FMS over the AP serves in theory to achieve desired turn shapes. In practice, the real trajectory is poorly controlled during turns.

With conventional manual piloting, the problem is the same: when anticipating a turn, the pilot is given a new course angle; the pilot then causes the helicopter to turn at "rate 1" and waits until reaching alignment with the new segment before straightening out the aircraft. No means are provided for modulating the inclination and thus the rate of turn.

In an FMS of the invention, horizontal guidance is implemented on the basis of departures from the setpoint trajectory, including during its curvilinear stages. The trajectory is calculated, e.g. using turns at "rate 1", corresponding to 3 degrees per second (°/s) of variation in heading, but the FMS has greater authority over the AP, e.g. up to "rate 1.5" (4.5°/s), thus enabling guidance to be maintained in a closed loop even while turning, and enabling corrections to be made to errors in following the trajectory due to fluctuations in the wind, where necessary.

With manual piloting, displaying the continuous curvilinear trajectory instead of successive rectilinear segments of the itinerary also makes it possible to provide curvilinear guidance; in both cases (automatic or manual guidance), the invention makes it possible to achieve trajectory accuracy in a horizontal plane that is much greater than that with a conventional system.

In a conventional FMS, vertical guidance is implemented on the basis of the difference between the altitude of the aircraft and the altitude of the current horizontal rectilinear segment. A start of climb (or sink) anticipation mechanism associated with the standard climb (or sink) speed of the AP makes it possible in theory to bring the predicted altitude to the proper location. However, while climbing (or sinking) is actually taking place, the FSM comes up against its authority limit so the aircraft is operating in an open loop and its trajectory can no longer be predicted precisely.

With manual piloting the problem is the same: when anticipating start of climb (or sink), the old altitude previously being followed is deleted and the new altitude to be reached and held is displayed (which altitude is also often off the scale of the barometric altimeter where this setpoint is usually displayed), and the pilot then causes the helicopter to start climbing (or sinking), e.g. at 700 feet per minute (ft/min) and waits until the new altitude has been reached before stopping climbing (or sinking).

In an FMS of the invention, vertical guidance is implemented on the basis of departures from the setpoint trajectory, including during climbing (or sinking) stages and pull-up stages (short curvilinear portions in a vertical plane). The trajectory is calculated with standard rates of climb (or sink) (e.g. 700 ft/min), but the FMS has somewhat greater authority over the AP (e.g. up to 1000 ft/min), thus enabling guidance to be maintained in a closed loop during climb (or sink) stages, and making it possible where necessary to correct tracking errors due to wind fluctuations, updrafts, or any other cause.

With manual piloting, the continuous nature of the trajectory makes it possible to use one or more "square-root" guidance symbols (as described in French patent No. 2 801 967) during all stages of flight.

Because the setpoint trajectory and any interference with terrain and obstacles is calculated cyclically in real time, this trajectory varies continuously as a function of the following: i) variations in the initial state vector: the trajectory remains "connected" to the aircraft, thus making it possible, for example, to display the climb instant "as late as possible" on approaching high ground; ii) the engine state of the aircraft: in the event of an engine breakdown, the slope of climb stages will be reduced, thus making it possible where appropriate for the pilot to anticipate flight portions that are no longer safe (impossible to overfly relief) and to modify the flight plan accordingly (e.g. flying around said relief); iii) wind force and direction: if the wind changes—given that the trajectory generator makes use of assumed air speed and vertical velocity—the slope of the trajectory varies, thus guaranteeing natural piloting "in the air" rather than forcing the pilot to keep the aircraft on a slope relative to the ground that is more difficult to follow; and iv) modifications made to the itinerary by the pilot.

If the device used for making modifications is a graphics pointer device (mouse, trackball, joystick, . . . ) and the trajectory and any interference are displayed on a cartographic background, then the interactive system makes extremely effective preparation possible: the pilot draws the itinerary, the reference trajectory is generated continuously (at a rate of about 12 Hz or faster) with a shape that is capable of being followed in flight, and any portion of the trajectory that interferes with the terrain or with obstacles is colored red. In order to modify the itinerary, all the pilot needs to do, for example, is to slide the ends of the segments or change their altitudes so as to eliminate the interference and obtain an itinerary and a planned trajectory that are safe.

Furthermore, by displaying turns as such, it is possible to avoid placing successive points too close to one another: in this type of situation, the trajectory generator might, for example "negotiate" turns that are too close with a corresponding reduction in helicopter speed, as can be seen by the turning radius becoming smaller; the pilot can then correct the situation if it is not desirable to take the turns at a very slow speed.

A system of the invention determines a trajectory that is flyable and that stays as close as possible to the itinerary drawn by the pilot; it detects, locates, and shows those portions of the trajectory (in fact those portions of the tube surrounding it) that interfere with the terrain model based on ground height data and on obstacles (vegetation and buildings on the ground).

The trajectory generator is advantageously implemented as a plurality of instances in a single system of the invention: a first generator is dedicated to processing the itinerary being followed to the destination; at least one other generator is used for preparing another itinerary (e.g. a return flight, if the pilot does not wish to have the itinerary include the go and the return flights). For a generator processing an itinerary other than the itinerary being followed to the destination, the "initial state vector" input can be fed with data other than the actual position and/or speed of the carrying aircraft:

for example it can be given the first point of the itinerary so that the entire trajectory is generated.

Figure 9:
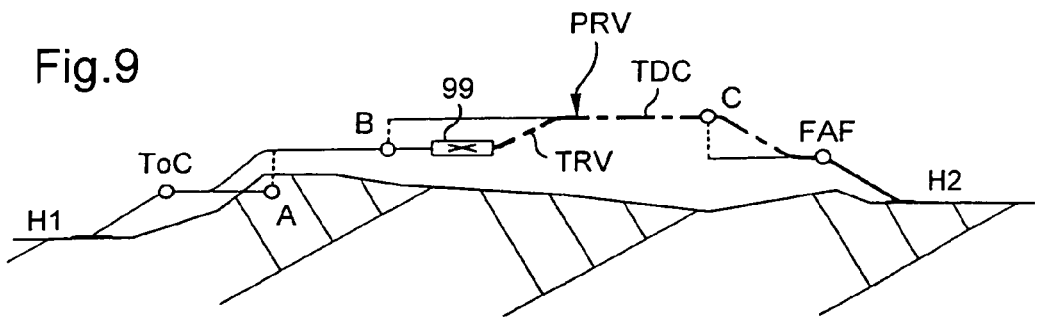
FIG. 9 shows a vertical re-joining trajectory in accordance with the invention.

The trajectory generator may be considered as being a simulator that propagates the initial state vector along the itinerary, showing where the aircraft is going to go, taking account of its current position, its engines, its weight, and wind strength. This characteristic of the trajectory generator enables it to generate a re-joining trajectory in a vertical plane, in the event of the aircraft departing from the initially intended trajectory, and as shown in FIG. 9.

In the event of a large lateral departure of the carrying aircraft from its destination itinerary, the trajectory generator can also be implemented in such a manner that it generates a horizontal re-joining trajectory.

Figure 6:
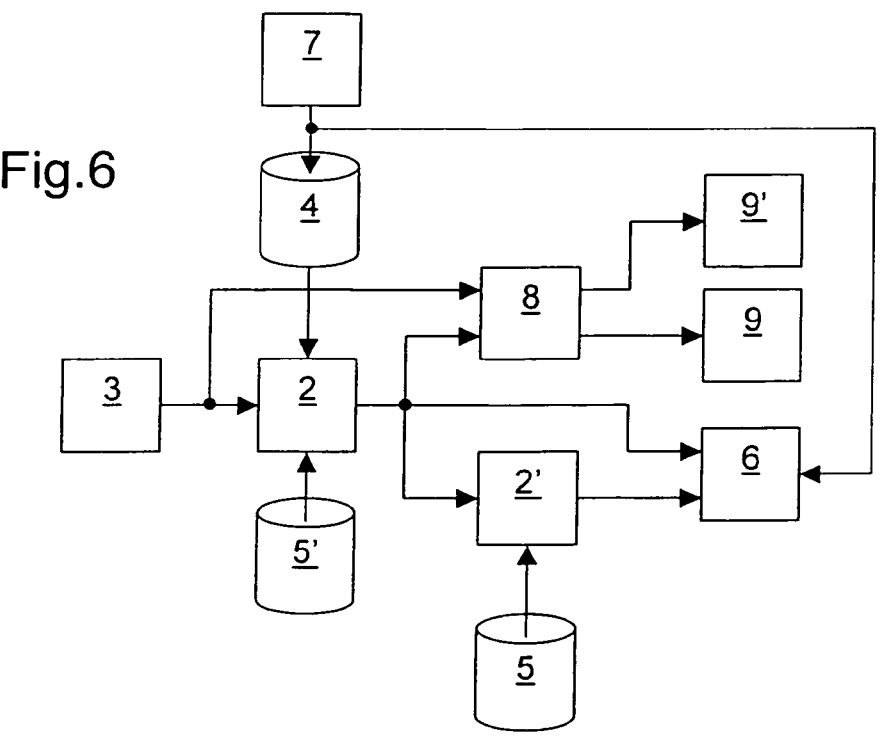
FIG. 6 is a simplified block diagram of apparatus in accordance with the invention.

With reference to FIG. 6, the apparatus 1 enables the method of the invention to be implemented and, while following a predetermined itinerary, it makes it possible using means on board the aircraft to perform the following operations in automatic manner:

a) calculating accurately a predicted trajectory for the aircraft;

b) verifying aircraft flight safety along the trajectory relative to terrain and obstacle height data; and c) enabling the on-board navigator to act in real time and in knowledge of the facts to modify the itinerary and/or the predicted trajectory, given the updated display of any interference.

More particularly, the apparatus 1 operates cyclically and in real time while preparing and/or following an itinerary defined in three dimensions to perform the following operations:

a) calculating an accurate setpoint trajectory compatible with the capacities of the aircraft; this setpoint trajectory begins with the current position of the aircraft and extends along the itinerary, and it terminates at the end of the itinerary;

b) detecting and locating any interference between a volume surrounding said setpoint trajectory and the terrain and obstacle height data;

c) presenting said setpoint trajectory on cartographic display means and presenting in distinct manner any portions of the setpoint trajectory that interfere with the terrain and obstacle height data; and d) generating guidance instructions for both a pilot data display device and an autopilot.

To do this, said apparatus 1 comprises:

a trajectory calculator 2 capable of—and programmed for—calculating the curvilinear trajectory in three dimensions, giving each point along the trajectory a predicted time and date of passage calculated as a function of predicted speed along the trajectory; the device calculates changes in latitude, longitude, and altitude of the aircraft as a function of time all along the trajectory;

a calculator 2' for detecting and locating interference; this calculator is connected to the output of the trajectory calculator 2 and also to the memory 5 containing the terrain and obstacle height data;

means 3 for acquiring parameters relating to the aircraft and the outside environment, said means 3 including in particular sensors, air data units, inertial navigation units or satellite positioning systems (DGPS, GPS or augmented GPS, SBAS); these parameters including in particular: geographical position in three dimensions, the three angles defining attitude and heading, the ground speed vector, the air speed vector, the static temperature and pressure of the surrounding air, the current weight of the aircraft, and the state of its engines (number of engines in operation); these means 3 are connected to the trajectory calculator 2, and also to the guidance calculator 8 in order to supply them cyclically and in real time with the updated data they need to perform their calculations;

a memory 4 for storing at least one itinerary that has been or is being constructed; said memory being connected to the trajectory calculator 2 in order to supply it with the itinerary that has been selected as the destination itinerary;

a memory 5 containing the terrain and obstacle height data over which the itinerary passes; this memory is connected to the calculator for detecting and locating interference;

a memory 5' containing data characteristics of the flight performance of the aircraft on board which the apparatus is installed; this memory is connected to the calculator 2 to supply it with this characteristic data;

display means 6 connected to the trajectory calculator 2 and also to the calculator 2' for detecting and locating interference; this connection serves to acquire the setpoint trajectory together with its zones of interference with the terrain and obstacles in order to display them on the screen in a distinct manner;

an interactive graphics tool 7 for constructing the itinerary, delivering itinerary modification data on being actuated or moved by the on-board operator; for this purpose, the tool 7 comprises a device for controlling a graphics pointer for specifying and manipulating itinerary elements in three dimensions; to perform these manipulations, the tool is connected to the itinerary memory 4; the tool is also connected to the display device 6 so as to show the position of the graphics pointer;

a guidance calculator 8 having one of its inputs connected to receive the setpoint trajectory generated by the calculator 2 and having another input connected to receive the state vector of the aircraft as measured by the sensors 3; the outputs from the guidance calculator are connected to the piloting data display device 9 and also to the autopilot system 9'; and a piloting data display device 9 comprising in particular an altitude and vertical velocity indicator, a cross track deviation indicator, and an air speed indicator.

Prior to undertaking a flight along a new itinerary, it is the general practice to prepare at least the beginning of the itinerary to ensure that it is safe. To save time, or because the final destination is not known on starting, it is then possible to take off and continue planning the subsequent itinerary on board the aircraft during the early stages of the flight.

The data corresponding to the itinerary that is being constructed or modified by the pilot or the navigator using the device for controlling the graphics pointer is input to the trajectory calculator 2 which derives therefrom a predicted trajectory complying with the itinerary and also, and on a priority basis, complying with the flight envelope of the aircraft, as contained in the memory 5'.

The interference calculator 2' uses the terrain and obstacle height data stored in the memory 5 and verifies that none of it represents an altitude higher than the floor of a safety volume—or tunnel—surrounding the setpoint trajectory. The safety volume is determined by the trajectory and by the safety margins defining the cross-section of said volume (i.e. margins constituting minimum distances that can be accepted relative to the relief, both in a horizontal plane and in a vertical plane, while taking account of piloting accuracy and the accuracy of the position sensors). Where appropriate, any location where the trajectory is in interference is marked as such.

Any interference detected and located by the calculator 2' is then drawn in a manner that is distinct from the remainder of the trajectory, which is likewise drawn on the screen of the display device 6. In this way, the pilot can modify the itinerary so as to cause those portions of the setpoint trajectory that are marked as being in interference to disappear.

To generate the trajectory, the calculator 2 also relies on various assumptions concerning foreseeable values and value variations in the state parameters (initial position, aircraft weight, aircraft engine condition, wind speed and direction, and temperature and density of the atmosphere). These parameters can also vary in non-foreseeable manner (changes of wind, engine breakdown, pilot decision to depart from and then return to the itinerary) or in a manner that can be foreseen only poorly (variations in the weight of the aircraft), but by performing the calculations cyclically and in real time, it is nevertheless possible to take them into account.

Thus, said setpoint trajectory is corrected by the calculator 2 as a function of the current parameters of the aircraft (weight, aerodynamic configuration, breakdown state of the engines), its state vector (position and speed), and the atmosphere vector (wind speed, pressure and temperature).

Accurate guidance of the aircraft along this updated trajectory is provided by the calculator 8, which issues continuous 3D instructions to the piloting parameter display system 9 and also to the autopilot 9'.

The calculator 8 also issues audible and/or visible warnings of excessive departures, which warnings are particularly useful when there is no autopilot, or during stages of flight in which the pilot's attention is diverted by tasks other than accurately guiding the aircraft along the setpoint trajectory (e.g. during radio procedures with air traffic control). These alerts are triggered before the aircraft reaches the end of the tunnel (as defined by the safety margins), so that the pilot can rectify the trajectory and thus avoid leaving the safe volume.

Using the display device 6 to display a symbol that represents the aircraft on the same cartographic display as the setpoint trajectory and the itinerary also contributes to the guidance function by giving the pilot a longer term view of how the flight is progressing, where appropriate.

When the aircraft departs from the predicted trajectory by a large distance, the calculator 2 makes use of the predicted trajectory and information coming from the acquisition means 3 to calculate a re-joining trajectory enabling it to return to the intended itinerary from the current point of the flight.

Figure 7:
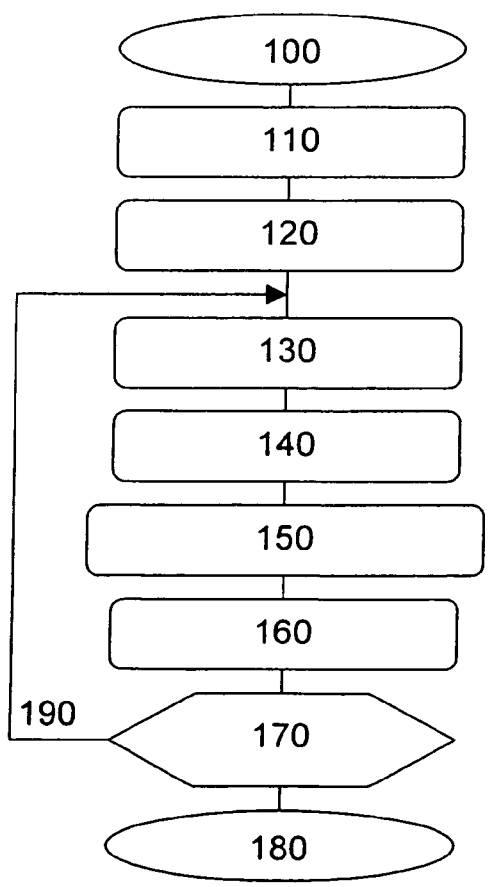
FIG. 7 is a simplified flow chart of a method in accordance with the invention.
Figure 8:
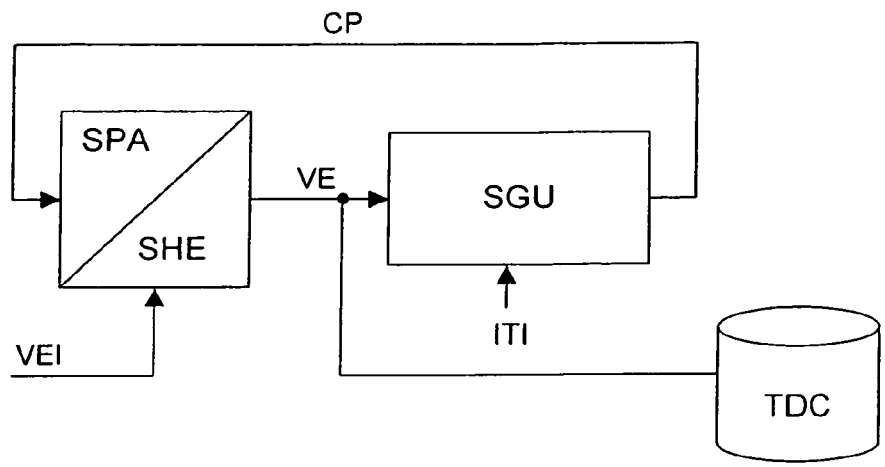
FIG. 8 is a block diagram of a trajectory calculation system in accordance with the invention.

With reference to FIGS. 7 and 8, on each cycle of calculating the TDC (e.g. 25 times a second), the flight is simulated in full from the present position (or the initial state vector VEI) to the final destination. This simulation is shown diagrammatically in FIG. 8.

Once every 40 milliseconds (ms) about 25×3600=90,000 integration steps are performed per hour of flight to the end of the itinerary that is to be simulated.

The calculation loop of the calculator 2 comprises a helicopter simulator SHE and an autopilot simulator SPA receiving as inputs piloting setpoints CP (typically a roll setpoint, an altitude setpoint, and an air speed setpoint), and outputs a state vector VE. The helicopter simulation can be relatively simple, but it is important that its flight envelope (i.e. its climb speed ability as a function of horizontal air speed, weight, air density, and engine configuration) as included in the simulator HSE is realistic.

The state vector VE of the simulated helicopter is input to a conventional 3D guidance module SGU that is likewise simulated and has another input receiving data for the current destination itinerary ITI. The simulated guidance module includes a sequencer for switching from one leg to the next with the usual anticipations of turns, changes of altitude, and changes of speed; and also algorithms for calculating roll, altitude, and speed setpoints.

On each start (step 100 in FIG. 7) of a 40 ms calculation cycle, if the TDC is to be refreshed at 25 Hz, the content of the memory containing the results of calculating the TDC during the preceding cycle is erased (step 110); the helicopter model (or virtual helicopter) is initialized (step 120) with the initial state vector VEI of the real helicopter.

Thereafter calculations (steps 130 and 140) for maintaining the virtual helicopter and providing virtual guidance algorithms are iterated. On each iteration, the trajectory TDC is stored (step 150) in a memory M organized as a table, the trajectory being in the form of the calculated 3D position together with the simulated time, and the index for the point to be calculated is incremented (step 160), i.e. the simulation moves on to the following point.

The stop criterion (step 180) for stopping these iterative calculations is that the simulated guidance has reached its end-of-itinerary state (test 170); otherwise, the operations 130 to 160 are repeated (conditional branch 190). These operations are shown diagrammatically by the flow chart of FIG. 7.

Thus, on each 40 ms cycle, a segmented description is obtained for the entire trajectory. The step required for time integration is not necessarily equal to the step required for calculating the entire trajectory. It is selected as a compromise between a desire to have small segments so as to produce a curve that is smooth and a desire to limit the size of the list of points making up the trajectory.

This method of generating the TDC relies on existing 3D guidance algorithms such as those that are implemented in existing IFR FMSes. It is thereafter easy to implement. However it suffers from the drawback of requiring relatively high computation power. In addition, the volume of the data constituting the resulting TDC is also large. That is why it can be advantageous to use an analytic method of calculation based on solving a system of differential equations governing a looped helicopter/AP/guidance process of the kind shown diagrammatically in FIG. 8, so as to reduce the computation power needed and the volume of data that results from the calculation.

With reference to FIG. 9, the calculator 2 determines a vertical re-joining trajectory TRV when the actual position of the aircraft 99 at the instant under consideration has departed from the trajectory TDC corresponding to the planned itinerary H1-ToC-A-B-C-FaF-H2, by more than predetermined (altitude) margins; the trajectory TRV is calculated as a function of data characteristic of the aircraft and of the environment; this re-joining trajectory replaces, up to the vertical re-joining point PRV, the initial portion of the TDC as calculated on the basis of the itinerary, and it joins the predicted trajectory TDC continuously at this point.

Figure 10:
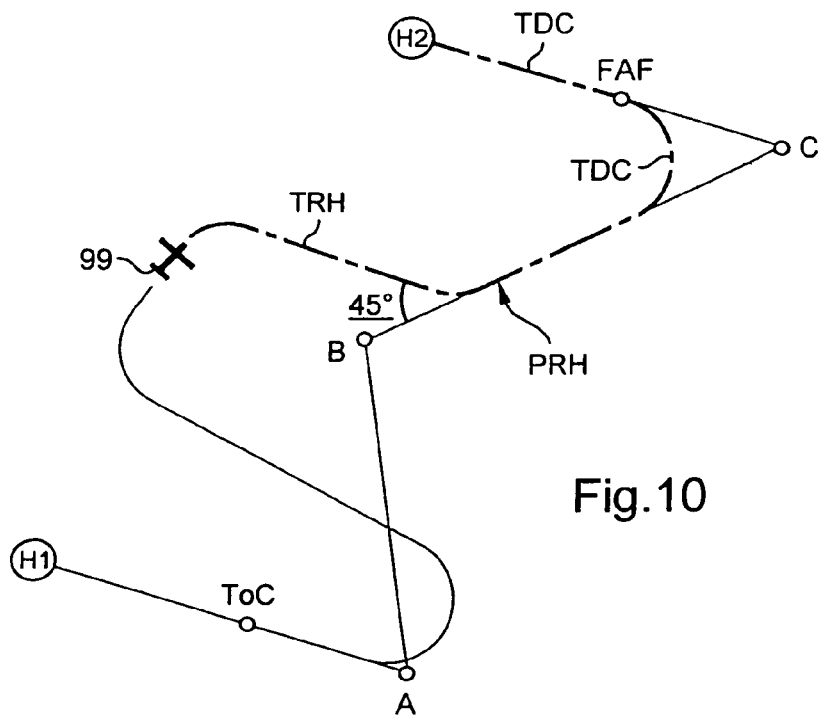
FIG. 10 shows a horizontal re-joining trajectory in accordance with the invention.

Similarly, with reference to FIG. 10, the calculator 2 determines a horizontal re-joining trajectory TRH when the actual position of the aircraft 99 at the instant under consideration has departed from the trajectory TDC corresponding to the planned itinerary H1-ToC-A-B-C-FaF-H2 by more than predetermined lateral margins; the trajectory TRH is calculated as a function of data characteristic of the aircraft and of the environment as a function of a re-joining angle (which is 45° in the example shown in FIG. 10); this re-joining trajectory is constituted by two curvilinear portions interconnected by a rectilinear portion extending along said re-joining angle; up the horizontal re-joining point PRH, it takes the place of the initial portion of the TDC calculated on the basis of the itinerary, and at said point is joins continuously with the predicted trajectory TDC.

In a general case, when the aircraft has departed from the planned itinerary by a large amount, the calculator determines a re-joining trajectory in three dimensions having vertical and horizontal projections reproducing respectively the characteristics of the re-joining trajectories shown in FIGS. 9 and 10.

The assistance provided to piloting the aircraft can be strengthened by means of systems making the following possible: i) a representation on a conventional navigation screen of the aircraft of the hypsometric environment in the form of terrain sections and horizontal views showing dangerous relief around the aircraft; ii) a representation on the same vertical and horizontal sections of the aviation environment of the aircraft, i.e. physical infrastructure (beacons, airports, . . . ) and virtual infrastructure (traffic control zones, reporting points, . . . ); and iii) a representation of other aircraft detected in the aviation environment overflown by an ACAS system.

The invention can advantageously replace a VFR FMS system. Its advantage is to provide the crew with complete management in three dimensions, thereby reducing work load, particularly when preparing a mission. The ability of a system of the invention to anticipate also provides significant assistance while following the itinerary.

The invention claimed is:

1. A method of providing assistance in navigating an aircraft (99) along an itinerary for the aircraft defined by itinerary data (ITI), the method comprising:
    calculating, on board the aircraft, a predicted trajectory (TDC) for the aircraft, as a function of the itinerary data (ITI) and characteristics of the aircraft, said predicted trajectory being continuous and three dimensional, including curvilinear portions, having no angle point; complying with the flight envelope of the aircraft; and
    calculating a predicted time/date or speed for points of the predicted trajectory.

2. The method according to claim 1, in which simulation is used to calculate at least a portion of the predicted trajectory in discrete manner, from an initial state vector (VEI) of the aircraft.

3. The method according to claim 2, wherein said simulation includes simulating an aircraft autopilot by an autopilot simulation (SPA) module, simulating the aircraft by an aircraft simulation (ATS) module, and simulating the aircraft guidance by a guidance simulation (SGU) module.

4. The method according to claim 1, in which at least a portion of the predicted trajectory is calculated analytically, by solving a system of differential equations.

5. The method according to claim 1, in which a curvilinear portion of the trajectory is calculated on the basis of a rate of variation in heading or in altitude that is less than the rate corresponding to the autopilot limitations.

6. The method according to claim 1, in which the predicted trajectory (TDC) is calculated as a function of characteristics of the aircraft and of the outside environment; the characteristics being acquired using means on board the aircraft (99) and including at least:
    a geographical position for the aircraft (99);
    angles defining attitude and heading of the aircraft (99);
    a ground speed vector for the aircraft (99);
    an air speed vector;
    static temperature and pressure of the air surrounding the aircraft (99); and
    current state of the weight and of the engine(s) of the aircraft (99).

7. The method according to claim 1, in which input of data modifying the itinerary and/or the trajectory is monitored, and in the event of an operator inputting data to modify the itinerary and/or the trajectory, the calculation of the trajectory is reiterated.

8. The method according to claim 1, in which all or part of a state vector of the aircraft is monitored and/or measured, including a 3D position component, a 3D speed component, aircraft weight, and/or a state for each engine, and in the event of a substantial change in the state vector being detected, the trajectory calculation is reiterated.

9. The method according to claim 1, in which a state vector of the atmosphere is monitored and/or measured, including wind speed, and/or air density or temperature, and whenever a substantial change in the state vector of the atmosphere is detected, calculation of the trajectory is reiterated.

10. The method according to claim 1, comprising the following steps:
    i) recording in at least one onboard memory predicted capabilities or characteristics for the aircraft, together with a terrain and obstacle model; and then with the help of an on-board computer:
    ii) calculating the predicted trajectory to be close to the itinerary and to correspond to the predicted capabilities or characteristics of the aircraft;
    iii) determining a tube or tunnel extending along the trajectory and of section that corresponds to safety margins;
    iv) looking to see whether a point of the terrain and obstacle model is included inside the tube or tunnel, and if so determining at least one trajectory portion that interferes with the terrain and obstacle model; and then
    v) where appropriate, presenting to an on-board operator said trajectory and/or the trajectory portion that interferes, and doing so at a presentation frequency.

11. The method according to claim 1, in which any interference between a safety volume extending along the setpoint trajectory and a terrain and obstacle model is determined, and any interference is presented to an on-board operator in a manner that is repeated in time and at a presentation frequency that is high enough to enable the itinerary to be modified so as to cause said interference to disappear.

12. The method according to claim 10, in which the presentation frequency is not less than 1 Hz.

13. The method according to claim 12, in which the frequency lies in the range 5 Hz to 100 Hz.

14. The method according to claim 10, in which, in order to present any interference to the pilot or operator, the following are displayed on a screen: a chart and/or a profile of the terrain to be overflown; a horizontal and/or vertical projection of the itinerary together with a horizontal and/or vertical section of the trajectory; and a first distinctive sign given to the portion(s) of the trajectory for which interference has been determined.

15. The method according to claim 1, in which the trajectory is corrected at regular time intervals at an updating frequency as a function of current parameters relating to the aircraft, the current point of the aircraft flight, and current parameters relating to the outside environment so as to obtain an updated setpoint trajectory for the pilot and/or the autopilot.

16. The method according to claim 1, in which it is verified that the distance between the predicted trajectory and the current position of the aircraft remains below a predetermined value, and if not, an audible alarm is triggered and/or a warning sign is displayed.

17. The method according to claim 16, in which the setpoint predicted trajectory includes a re-joining trajectory (TRV, TRH) calculated to connect the current position of the aircraft to the itinerary.

18. The method according to claim 1, in which the setpoint trajectory includes at least one takeoff trajectory (H1-ToC) and at least one landing trajectory (FAF-H2).

19. An apparatus (1) on board or mountable on board a rotary-wing aircraft (99) so as to facilitate navigating, guiding, and piloting, the apparatus (1) comprising:
   a system (2) programmed to calculate a three-dimensional continuous predicted aircraft trajectory (TDC) that is close to an itinerary, in accordance with the method of claim 1.

20. The apparatus according to claim 19, the apparatus (1) including a tool (7) for inputting itinerary data, a module for monitoring data input by said tool, and for causing the trajectory calculation to be reiterated when itinerary data is modified, and a member (6) for displaying the calculated trajectory.

21. The apparatus according to claim 19, the apparatus (1) comprising:
   acquisition means (3) for acquiring parameters relating to the aircraft and to the outside environment, which acquisition means include means for accurately determining the position of the aircraft in three dimensions;
   a modifiable memory (4) or database for storing the itinerary;
   a memory (5) or database containing data concerning the height of terrain and obstacles to be overflown;
   display means (6) for displaying a chart to an on-board operator;
   an interactive graphics tool (7) for constructing the itinerary;
   trajectory calculation means (2) for calculating an essentially curvilinear trajectory in three dimensions that is close to the itinerary and that corresponds to the predicted capabilities of the aircraft, and preferably doing so at a calculation frequency that is not less than the presentation frequency;
   detector means (2') for detecting any interference between a safety volume extending along the calculated trajectory and terrain overflown by the aircraft;
   a guidance calculator (8) having inputs connected to the trajectory calculation means (2) and to the sensors (3), and having outputs connected both to a pilot data display device (9) and to an autopilot system (9'); and
   visual presentation means (6, 9) for presenting any interference to an onboard operator in a manner that is repeated in time at a presentation frequency that is high enough to enable the operator to modify the itinerary using the interactive tool so as to cause the interference to disappear.

22. A method of providing assistance in navigating an aircraft (99) along an itinerary for the aircraft, the itinerary being defined by itinerary data (ITI) including waypoints to be over flown, approached, or landed on by the aircraft the method comprising:
   calculating, on board the aircraft, a predicted trajectory (TDC) for the aircraft, as a function of the itinerary data (ITI) and characteristics of the aircraft, said predicted trajectory being close to the itinerary being continuous and three dimensional, including curvilinear portions, having no angle point, and complying with the flight envelope of the aircraft;
   calculating a predicted time/date or speed for several points of the predicted trajectory;
   determining whether a portion of the predicted trajectory interferes with a terrain and obstacle model; and
   displaying said portion of the predicted trajectory.

* * * * *